(No Model.) 3 Sheets—Sheet 1.
J. N. MAHER & T. H. WHELESS.
CAR TRUCK BOLSTER.
No. 540,174. Patented May 28, 1895.
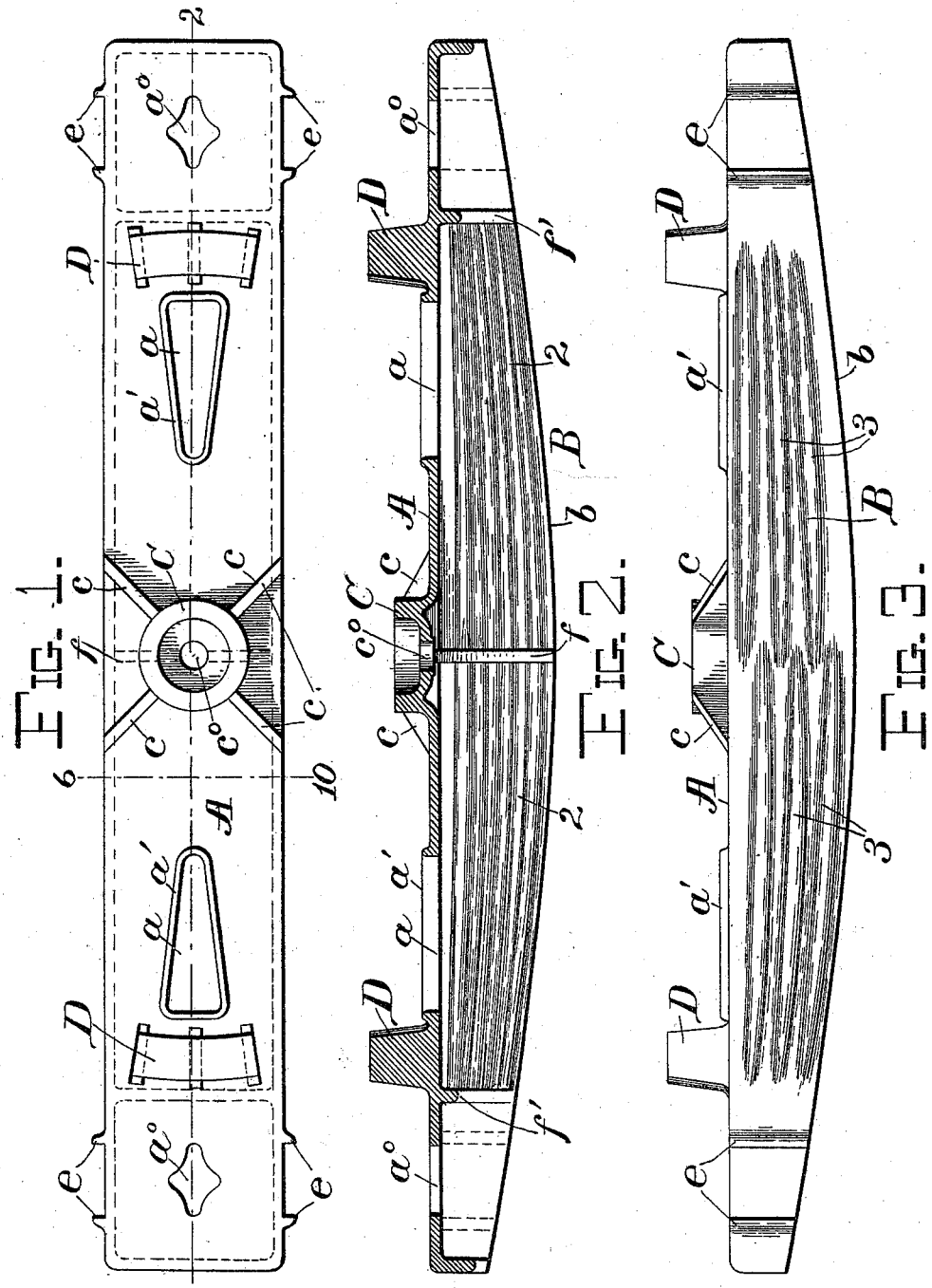
Witnesses
Percy C. Bowen
Maurice J. Sirosa
Inventors
John N. Maher &
Thomas H. Wheless,
By Whitman & Wilkinson
Attorneys.
THE NORRIS PETERS CO., PHOTO-LITHO., WASHINGTON, D. C.

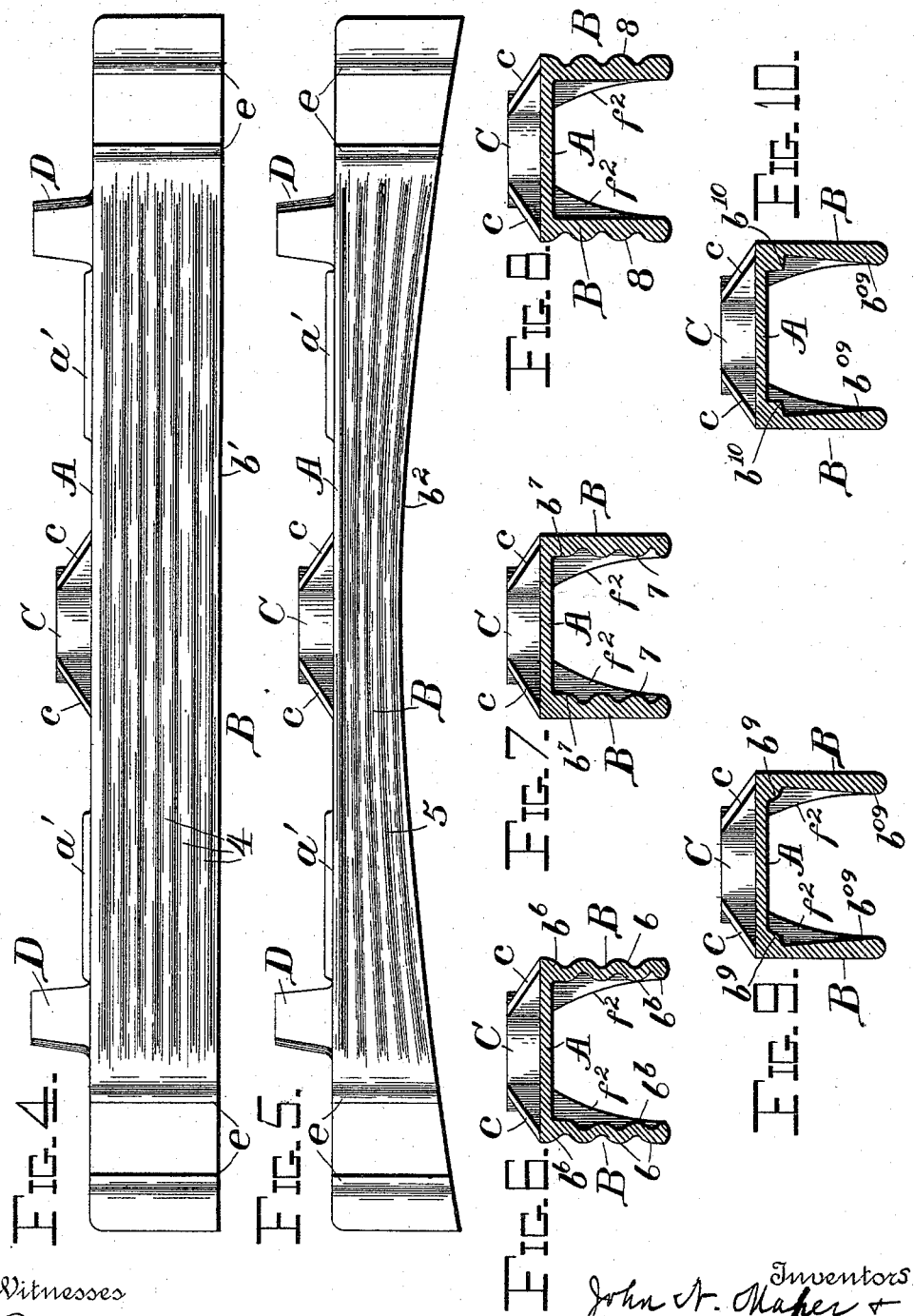

(No Model.) 3 Sheets—Sheet 3.
J. N. MAHER & T. H. WHELESS.
CAR TRUCK BOLSTER.
No. 540,174. Patented May 28, 1895.
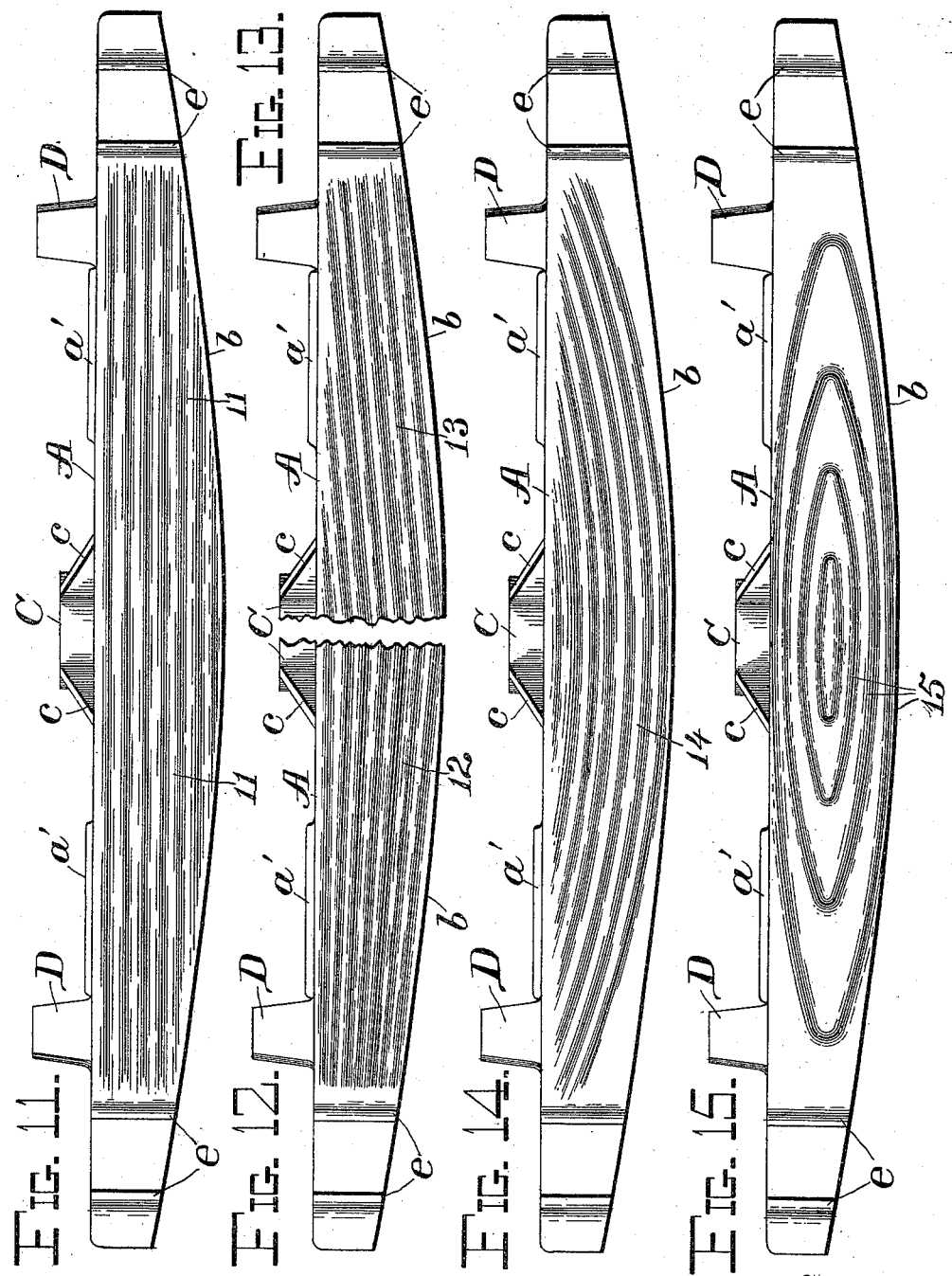

UNITED STATES PATENT OFFICE.

JOHN N. MAHER, OF ALLIANCE, OHIO, AND THOMAS H. WHELESS, OF AUSTIN, TEXAS.

CAR-TRUCK BOLSTER.

SPECIFICATION forming part of Letters Patent No. 540,174, dated May 28, 1895.

Application filed April 11, 1895. Serial No. 545,403. (No model.)

*To all whom it may concern:*

Be it known that we, JOHN N. MAHER, residing at Alliance, in the county of Stark and State of Ohio, and THOMAS H. WHELESS, residing at Austin, in the county of Travis and State of Texas, citizens of the United States, have invented certain new and useful Improvements in Car-Truck Bolsters; and we do hereby declare the following to be a full, clear, and exact description of the invention, such as will enable others skilled in the art to which it appertains to make and use the same.

Our invention relates to improvements in car truck bolsters, and it consists in providing a bolster made of cast steel or malleable iron, cast in one piece, and provided with a plurality of corrugations running longitudinally or in an approximately longitudinal direction along the girders which form the sides of the said bolster. These corrugations may be confined either to the exterior alone, or to the interior alone of the girders, or both the interior and the exterior of the girders may be corrugated. Moreover these corrugations may be made in any form provided the essential idea be carried out that the said corrugations shall run either longitudinally along the girder, or in an approximately longitudinal direction relative to the axis of the girder.

Our invention also consists in certain other novel features of construction which will be hereinafter more fully described and claimed.

Reference is had to the accompanying drawings, in which the same parts are indicated by the same letters and numerals throughout the several views.

Figure 1 represents a plan view of a metallic bolster cast in one piece and shaped according to our invention. Fig. 2 represents a longitudinal section through the bolster shown in Fig. 1 along the line 2 2 of the said figure. Fig. 3 represents a side elevation of a bolster manufactured according to our invention and showing the corrugations overlapping each other about the center of a bolster. Fig. 4 represents a side elevation of a rectilinear bolster, and Fig. 5 represents a side elevation of a bolster arched in the center, both being manufactured in accordance with our invention. Fig. 6 represents a section along the line 6 10 of Fig. 1 and shows a double corrugated girder. Figs. 7, 8, 9, and 10 represent modified forms of girder with means for bracing the same and for "feeding" the girder while being cast. Figs. 6 to 10 are supposed to represent sections about the position indicated by the line 6 10 on Fig. 1, but showing different types of bolster. Fig. 11 represents a side elevation of another form of bolster, showing horizontal corrugations. Fig. 12 represents a bolster provided with corrugations somewhat divergent or fan-shaped, while Fig. 13 represents part of a bolster having parallel inclined corrugations. Figs. 14 and 15 represent bolsters of a similar type, but having the corrugations curved, as shown.

A represents the bolster top or top plate, which is cast with openings $a$ and $a^0$ to lessen the weight of the bolster, while the said openings $a$ have raised or ribbed edges $a'$, to lend additional strength to these portions. On either side of these top plates A are the downwardly projecting girders B, which may be either curved along their bottom edges in the form of an inverted arch as at $b$, or straight as at $b'$, (see Fig. 4,) or arched upward as at $b^2$. (See Fig. 5.) The ends of the girders and of the top plate are connected together by end webs, while the ribs or webs $f$ or $f'$, or $f^2$, are cast with the girders connecting them to the top plate and adding strength and rigidity to the entire structure.

The upper portions of the girders, where they join the top plate are preferably enlarged as shown at $b^6$ in Fig. 6, or at $b^7$ in Fig. 7, or at $b^9$ in Fig. 9, or $b^{10}$ in Fig. 10, which enlarged portions serve not only to stiffen that part of the bolster, and to connect the girder more firmly to the top plate, but also serve, in a measure, as a sinking head, from which the metal is fed down to the girder and an allowance is made for the scoriæ which rise from the molten mass toward the top of the casting.

The girders are provided with corrugations which extend either longitudinally, or in an approximately longitudinal direction, and which may be of any desired contour or arrangement. Thus in Fig. 2, the numeral 2 represents a plurality of corrugations provided on the inner face of the girder and running from the central rib $f$ to the outer rib $f'$. The girder shown in Fig. 2 may be corrugated on its outer face also if desired.

In Fig. 3 the corrugations 3 have their ends interpenetrating as shown and the said corrugations extend longitudinally along the central portion of the exterior of each girder. The inner face of the girder may be also longitudinally corrugated if desired.

In the rectangular girder shown in Fig. 4, the corrugations 4 are represented as horizontal and parallel. These corrugations may be on the inner face as well as on the outer face of the girder.

In Fig. 5 the corrugations are shown as running continuously nearly the entire length of the girder, and these corrugations 5 are arched upward to conform to the arched face of the girder.

In Fig. 6 the girders are shown as provided with corrugations 6 on the outer surface thereof, and with similar corrugations $6^b$ on the inner surface, the said corrugations, running longitudinally along the girder.

In Fig. 7 the longitudinal corrugations 7 are shown as confined to the inner faces of the girders.

In Fig. 8 the corrugations 8 are shown as only on the exterior faces of the girders.

In Fig. 9 the section is taken where there are no corrugations, and the girders are made thicker at the bottom as at $b^{09}$, to avoid cracks in the casting.

In Fig. 10 an analogous structure is shown, except that the strengthening and feeding ribs $b^9$, which are made rounded as shown in Fig. 9, are made angular as shown at $b^{10}$ in Fig. 10.

In Fig. 11 the corrugations 11 are shown as horizontal and running throughout nearly the entire length of the girder.

In Fig. 12 the corrugations 12 spread out toward the center of the girder and are contracted toward the end, while in Fig. 13 the corrugations 13 are parallel and set at an angle with the top plate.

In Fig. 14 the corrugations 14 are shown as curved upward at the ends, while in Fig. 15 the corrugations 15 are in the shape of flattened ellipses.

In any of the types it will be obvious that the corrugations may be on either or both sides of each girder.

Near each end of the girder guides $e$ are provided to receive the pillars. Not shown.

C represents the center-plate bearing which is provided with a hole $c^0$ for the king-bolt, and with stiffening ribs $c$ extending down to the top and edges of the top plate.

D represents one of the side plate bearings for the body of the car.

The herein described bolster presents a light, cheap, simple, and strong structure, which may be readily cast whole and adapted for use on the cars with little machining and at little expense. The corrugations, extending longitudinally give the necessary resiliency to the cast structure, and distribute the strain suddenly imposed on the top plate through the mass of the material without over-straining any particular part. Moreover by casting the girders with longitudinal corrugations, these are relieved of the shrink strains which are found to be very objectionable where short and vertical corrugations are used.

We are aware that vertical corrugations have hitherto been used, but these have been found unsatisfactory due to the fact of the shrinking strains as already referred to, and also to the fact that they allow the bolster to sag in the middle under heavy pressure.

By having the re-inforce near the junction of the girders and the top plate as shown at $b^7$, $b^9$, $b^{10}$, in Figs. 7, 9 and 10 respectively, the girders are materially strengthened at the portion where it is found that breakage is most likely to occur, while the other portion of the girder most likely to be broken, that is, near the lower edge thereof, is strengthened as at $b^{09}$ in the structures shown in Figs. 9 and 10.

The bolster shown in Fig. 5 is provided with arch shaped girders, which combine with the diminished mass of material the well known strength of the arch; and the mass of metal to yield a desired strength, may, it is believed, be made less with this form of girder, than with the girders formed in an inverted arch shape as are now most commonly in use.

By the herein-described construction the bolsters may be readily and conveniently cast out of steel, or malleable iron, or other metal, and great strength, cheapness, and durability are obtained. These and the other advantages of the herein-described construction will readily suggest themselves to any one skilled in the art.

Having thus described our invention, what we claim, and desire to secure by Letters Patent of the United States, is—

1. A car-truck bolster provided with vertical sides or girders corrugated longitudinally, substantially as described.

2. A car-truck bolster provided with downwardly projecting sides or girders having longitudinal corrugations on each face thereof, substantially as described.

3. A car-truck bolster provided with downwardly projecting sides or girders, with longitudinal corrugations on said girders, and a reinforce or rib on the interior of the bolster and at the junction of said girders with the upper portion, or top plate, of said bolster, substantially as described.

4. In a car-truck bolster, the combination with a top plate having a center plate bearing and side plate bearing projecting upward therefrom, of downwardly projecting sides or girders, corrugated in an approximately longitudinal direction, and provided with a reinforce or enlargement where the said girders join the said top plate, substantially as described.

5. In a car-truck bolster, the combination with a top plate having a center plate bearing and side plate bearing projecting upward therefrom, of downwardly projecting sides or girders corrugated in an approximately longitudinal direction, and provided with a reinforce or enlargement where the said girders join the said top plate, and with curved ribs projecting inward from said girders and connecting them with the lower face of said top plate, substantially as described.

6. An arch shaped car-truck bolster provided with vertical sides or girders corrugated longitudinally, substantially as described.

7. An arch shaped car-truck bolster provided with downwardly projecting sides or girders having longitudinal corrugations on each face thereof, substantially as described.

8. An arch shaped car-truck bolster provided with downwardly projecting sides or girders, with longitudinal corrugations on said girders, and a reinforce or rib on the interior of the bolster and at the junction of said girders with the upper portion, or top plate, of said bolster, substantially as described.

In testimony whereof we affix our signatures in presence of two witnesses.

JOHN N. MAHER.
THOMAS H. WHELESS.

Witnesses:
ISIDORE KOCH,
C. C. DAVIDSON.